Figures 1, 2:
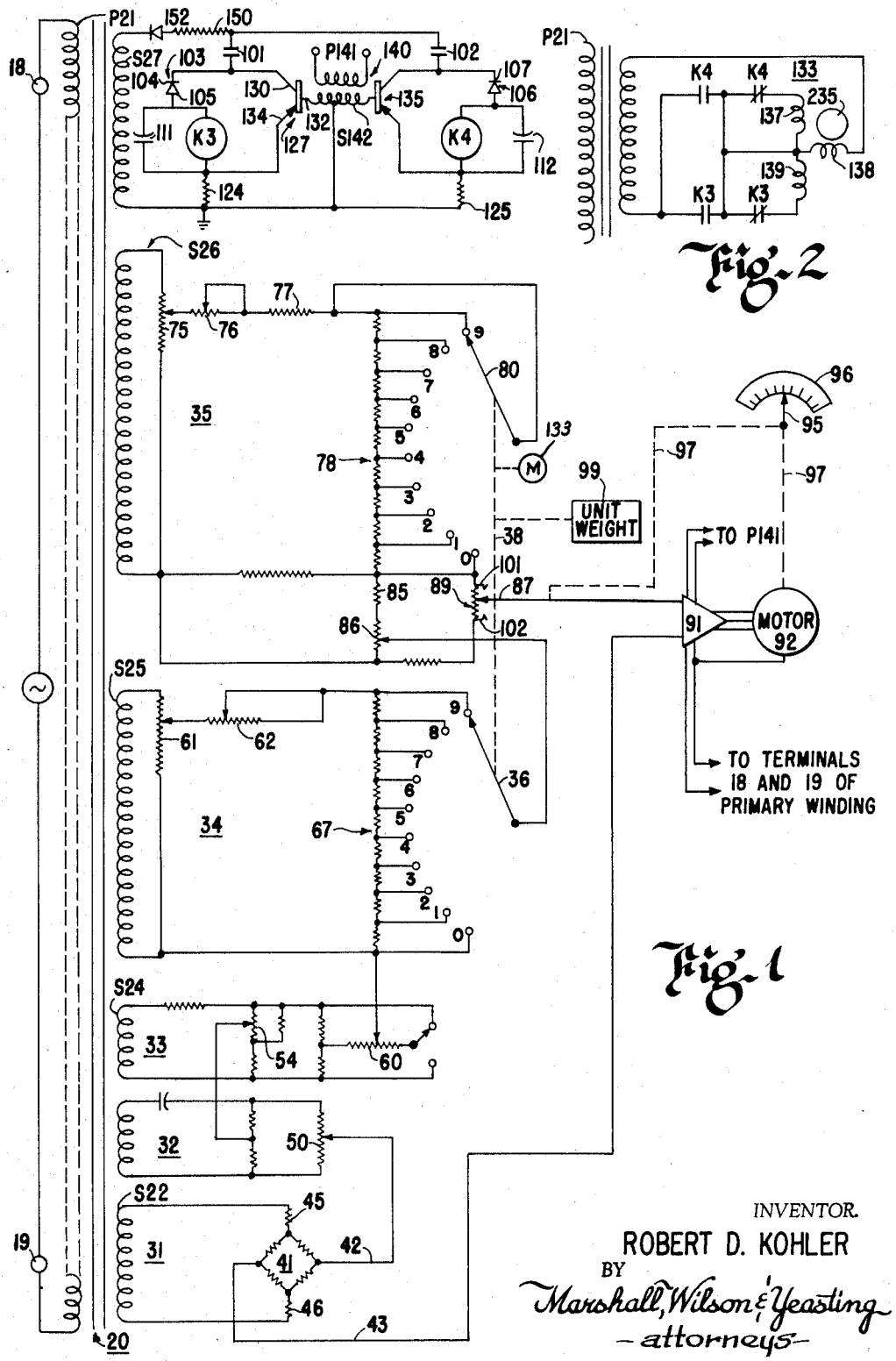

Dec. 7, 1965  R. D. KOHLER  3,221,828
AUXILIARY LOAD CIRCUITRY FOR LOAD RESPONSIVE DEVICES
Filed Jan. 8, 1964

INVENTOR.
ROBERT D. KOHLER
BY
Marshall, Wilson & Yeasting
- attorneys -

United States Patent Office 3,221,828
Patented Dec. 7, 1965

3,221,828
AUXILIARY LOAD CIRCUITRY FOR LOAD
RESPONSIVE DEVICES
Robert D. Kohler, Temperance, Mich., assignor to Toledo
Scale Corporation, Toledo, Ohio, a corporation of
Ohio
Filed Jan. 8, 1964, Ser. No. 336,452
6 Claims. (Cl. 177—210)

This invention relates to load responsive devices and in particular to circuitry for changing the load capacity of such devices.

An increase in the accuracy and sensitivity of load measurements has been found to result if the load indicating mechanism, which has usually taken the form of a relatively movable weight chart and indicating pointer, is made to have a normal capacity that is equal to a fraction of the total load capacity of the load measuring system. As larger load accommodating capacity is needed increments of load balancing unit weights, or range steps, can be selectively added without decreasing the sensitivity of indication. Obviously if the capacity of the scale is changed, suitable indicators must be activated to note the correct capacity of the scale, such as a unit weight indicating mechanism which is responsive to indicate the amount of weight which must be added to the chart indication to accurately reflect the amount of applied load. Of course, it is also necessary to insure that only the desired amount of unit weights or range steps are changed.

The amount of capacity change must be accurately determined, and means must also be provided to insure, that an amount greater than the necessary load accommodating capacity will not be added to the normal chart indicating capacity. It is obvious that the scale capacity changing device must, in order to not adversely affect the speed of the load responsive device, be fast acting, and this requires that a measurement be quickly made after the changing of a range step to determine if the capacity of the load responsive device is then of proper load accommodating capacity and to permit further range step changes if necessary, or to prevent them if they are not necessary.

Accordingly, it is an object of this invention to provide automatic means for changing the capacity of the load responsive mechanism without decreasing the sensitivity of indication given by an indicator, and remote signals, operated in conjunction with said means, for indicating the current capacity of the scale.

It is another object of this invention to provide a fast-acting scale capacity changing circuit which insures that only the correct number of capacity range step changes will be made in the device by an accurate and quick-acting checking circuit.

It is still a further object of this invention to provide a phase sensitive checking circuit to continuously monitor a scale capacity increasing circuit and prevent further changes of range therein upon the attainment of a proper load accommodating scale capacity.

In accordance with the above and first briefly described the invention provides a load receiving transducing element which generates a voltage in response to, and in proportion to the load applied to the scale platform. A counterbalancing voltage circuit generating a voltage in phase opposition to that of the transducing element is also provided, and includes a chart potentiometer having a servo driven selectively positionable arm providing a voltage to the counterbalancing circuit in accordance with the setting thereof. There is also provided a multitap system capacity changing resistor having a motor driven tap selecting arm which provides a plurality of increments of voltage to said counterbalancing circuit in accordance with the tap selected. There is also provided an error detecting amplifier which is operatively connected in circuit with the transducing element and the counterbalancing circuit to operatively drive the servomotor in either of two directions in response to the phase of the detected error signal, and in addition a phase sensitive control circuit for the motor driving the tap selecting arm of the multitap resistor is also provided. Further, chart potentiometer terminal indicating means which are operable in response to the servo driven potentiometer arm approaching either of the terminal positions of the chart potentiometer are also provided. Activating means for the tap arm driving motor which are responsive to the terminal indicating means indicating that the servo driven potentiometer arm is approaching either of the chart potentiometer's terminals results in a change of the tap setting of the multitap resistor to thereby provide the appropriate counterbalancing voltage to oppose the voltage from the transducer. The above-mentioned error detecting amplifier generates an error signal of a given phase in response to the counterbalancing voltage circuit providing a signal of improper balancing range relative to the transducing voltage, and generates an error signal of an opposite phase upon said voltage provided by said counterbalancing circuit being with a balanceable range. There is further provided phase sensitive means that prevent further changes in the tap setting of the tap resistor upon sensing a change in phase of the error signal. Lastly, load indicating means which indicate the magnitude of applied load in response to the amount of counterbalancing voltage necessary to balance the voltage from the transducer are also provided.

Other objects, features and advantages of my invention will become apparent from the following detailed description taken in connection with the accompanying drawings, wherein:

FIGURE 1 is a schematic wiring diagram showing the essential components of an electronic weighing scale; and FIGURE 2 is a schematic wiring diagram which brings out the relationship between the adjustable balancing voltage terminal indicating switches, and the capacity changing motor control circuitry of my invention.

The invention is illustrated in FIG. 1 as applied to a weighing system 31 employing load cell actuated resistance 41 to generate a signal characteristic of a load. These translators, sometimes termed strain gages, have resistance values in the individual bridge arms which change with the strains imposed thereon incidental to the distortion due to an applied load on the supporting element of the load cell. Therefore, when energized from an external source, secondary winding 22, a signal which is a function of the distortion and hence the load is issued from the gage across the leads labeled 42 and 43. Load cell 31 is of conventional design, and any of the many well-known commercially available types may be used therefor. Further, system 31 may be a single cell or as many additional cells as are necessary may be connected in series to result in the desired weighing scale capacity. Load cell 31 includes the conventional mechanical elements normally associated therewith (not shown) including a load receiver and suitable coupling for transmittal of the strain experienced by the strain gage 41 to the resistance bridge shown in FIG. 1. Also, the current and voltage supplied by secondary winding 22 is maintained at the desired level by resistors 45 and 46. Displacement of the load receiver, not shown, by the application of a load thereto alters the resistance of the bridge circuit to produce a signal voltage across lines 42 and 43, in accordance with well-known strain gage techniques.

The output signal from the load cells or weight signal translators 31 which is significant is the net change from the unloaded to the loaded condition, and therefore, the bridges are normally adjusted to be essentially in balance with no signal being developed across the output terminals when the load receiver is unloaded. Thus, the signal generated across leads 42 and 43 ideally is zero with no load on the system. Moreover, in order to measure the load applied to load cells 31, which results in a voltage differential being established between conductors 42 and 43, lead 43 is shown connected to error detecting amplifier and servomotor control device 91. As shown control amplifier 91 controls the operation of servomotor 92 which in turn positions indicator 95 and the sliding contact 87 of adjustable scale or chart potentiometer 89 by way of suitable driving connection 97. Additional counterbalancing voltage which is also in phase opposition to the voltage from transducer 31, the resulting difference between the last mentioned voltages form the error voltage developed by motor control amplifier 91, is generated by connecting quadrature adjust potentiometer 50, zero adjust potentiometer 60, multitapped range step resistor 67 and multitapped span resistor 78 by way of double-decked selector switch 38, and scale potentiometer 89 in circuit with conductor 42 in a manner as shown in FIG. 1. The proper voltage across multitapped resistor 67 is established by connecting potentiometer 61 as well as variable resistor 62 between the multitap range step resistor 67 and the secondary transformer winding 25. Likewise the correct voltage across the adjustable scale potentiometer 89 for the particular range step desired is established by potentiometer 75, shown connected across secondary winding 26, variable resistor 76, fixed resistor 77, multitapped span resistor 78, fixed resistor 85, and zero adjust potentiometer 86.

Transducing system 31 is supplied with alternating current from the secondary winding 22 of power transformer 20 which has its primary winding 21 connected to a suitable source of alternating current. Also, suitable operating potential to the control and excitation windings of servomotor 92 is supplied by connecting them to an alternating current source. Furthermore, the operating potential for the motor 133 that controls the tap position of bidirectionally movable switch 38 is also supplied from transformer 21 to insure that it is the same frequency and power phase as that supplied to the error detector 91.

Quadrature adjust potentiometer 50 introduces a quadrature signal which is 90 or 270 electrical degrees out-of-phase with the signal generated by the load cell transducer 31 and thereby cancels the quadrature component of the load cell signal to insure that amplifier 91 will not be saturated by these components. Also the zero adjust potentiometers 54 and 60, connected in circuit with secondary winding 24 in the manner shown in FIG. 1, provides a voltage which is proportional to the system tare and 180 electrical degrees out-of-phase with the signal from transducer 31 to thereby further reduce the load cell's signal in accordance with the magnitude thereof.

Also range potentiometer 61 is shown to be connected across transformer secondary 25. A series circuit arrangement of variable potentiometer 62 and the multitapped range resistor 67 is then connected in parallel with range potentiometer 61. Further, as shown in FIG. 1, range resistor 67 is shown having nine fixed taps which, together with the adjustable scale potentiometer 89 form ten divisions or range steps over which the zero to full load capacity of load cell 31 can be divided.

Span potentiometer 75 is operatively connected across secondary winding 26 of transformer 20. The selectively positionable tap of span potentiometer 75 is then connected in circuit with potentiometer 76, fixed resistor 77, multitapped resistor 78, fixed resistor 85, and zero adjust potentiometer 86 across the potentiometer 75. Further, precision potentiometer 89 and fixed resistor 90 form a series circuit across resistor 85 and zero potentiometer 86.

Potentiometer 86 functions to insert a small signal in series with the counterbalancing voltage and is adjustable to balance the output of scale potentiometer 89 so that the dial indicator will be positioned at zero with no load on load cell unit 31. More specifically potentiometer 86 compensates for the end resistance of potentiometer 89. The resistance afforded by resistor 90 adds to the effective end resistance of potentiometer 89, that resistance which is actually still in circuit even though the adjustable arm 87 of potentiometer 89 is at its lowermost setting, and accordingly results in the adjustable arm of potentiometer 86 being positioned midway of its end terminals to accordingly permit zero adjustment in both directions. Using the lowermost terminal of secondary winding 26 as a reference the zero potentiometer as a reference the zero setting potentiometer 86 is properly set when the differential voltage between the wipers of potentiometers 86 and 89 is zero. Upon the differential voltage between the wipers of potentiometers 86 and 89 being zero then the span voltage or voltage across 89 can be varied, by different settings of span adjusting resistor 78 without changing the zero position of wiper 87. This obviously results in considerable saving of time over a system which does not provide for an unfluctuating zero setting with changes in total voltage across a potentiometer.

There is also provided a double-deck switch 38, which is automatically operated in a manner to be more fully disclosed later. By means of the double-deck switch 38 the potential across the adjustable potentiometer 89 will vary in accordance with the range step setting of multitapped resistor 67 and accordingly accommodate the current load applied to the load cell system 31. Specifically, since it is desired that the weighing scale have a high sensitivity and a high capacity it is obvious that the scale potentiometer 89 cannot be the sole counterbalancing voltage source to oppose the voltage generated at transducer 31, for if that were the case the entire expanse between the limits or terminals of chart potentiometer 89 would have to be divided over the full capacity of the load cell system 31. However, by providing a nine tap resistor 67 and the additional adjustable scale potentiometer 89 it is seen that only ten percent of the full capacity load voltage need be counterbalanced by potentiometer 89 for any given loading conditions. That is, the ten range steps provided by the nine tap positions of multitap resistor 67 and the final tap, so to speak, provided by adjustable scale potentiometer 89, enables me to increase the system's sensitivity in that at any given time scale potentiometer 89 would only have to accommodate ten percent of the load capacity of the scale system, and assuming that a scale capacity of 100,000 pounds was necessary it follows that scale 89 and dial 96 would be used to register 10,000 pounds. This arrangement would obviously be a vast improvement in accuracy and sensitivity over a system which would require a dial chart to read the full 100,000 pounds. Accordingly, a great increase in sensitivity is achieved by using a load voltage balancing arrangement wherein the scale potentiometer 89 and auxiliary load mechanism 67 (the range step potentiometer or multitap resistor) conjointly provide enough counterbalancing voltage to oppose the live load portion of the voltage generated by transducer 31. Therefore, the scale potentiometer 89 now will not have to oppose all of the voltage generated by transducer 31 but only a small fraction thereof, depending upon the amount of auxiliary load capacity available.

It should of course be appreciated that the load translating device 31 can be changed to be able to accommodate various upper limits of load. In this case I have arbitrarily assumed a capacity of 100,000 pounds, and since there are commercially available load indicating pointer and chart assemblies that are capable of accurately handling 10,000 pounds it follows that I will require ten range steps to accommodate the entire 100,000 pounds. It should also be appreciated that the voltage function generated by load translator 31 may assume any type of relationship with respect to the input load. Accordingly, it does not follow that the multiple tap resistor 67 and the adjustable potentiometer 89 will be set to provide equal increments of counterbalancing voltage for different tap settings. Only after the voltage function which will be generated by translator 31 is known, by information supplied by the manufacturer or by a trial basis, will the incremental voltage changes be known. For example, it may turn out that translator 31 will yield three millivolts of voltage for the first 10,000 pounds, seven millivolts for 20,000 pounds, twelve millivolts for 30,000 pounds, . . . and 74 millivolts for 100,000 pounds. Obviously this is not a linear function and it would not be accurate to position the plurality of taps on resistor 67 to yield equal increments of voltage for selectively higher or lower changes therein. From the above it is also clear that some means must be provided to insure that the scale potentiometer 89 will have the correct voltage differential thereacross for the particular range step then in operation. Specifically, since for the first 10,000 pounds the full dial reading of chart 96 must be divided over three millivolts, whereas it will have to accommodate four millivolts for the next 10,000 pounds, and five for the following 10,000 pounds, etc., some means must be provided to change the voltage across adjustable potentiometer 89. This is accomplished in my system by the multitapped resistor 78 and deck 80 of doubledeck switch 38, for as the tap setting of resistor 67 is changed by deck 36 of double-deck switch 38 a corresponding change in the tap setting of resistor 78 will occur to insure that scale potentiometer 89 will at all times have the correct voltage thereacross. Accordingly with no range steps placed into operation both deck 36 and 80 will be respectively at the zero taps of resistor 67 and 78, and while in that position adjustable potentiometer 89 will have a voltage thereacross of three millivolts. Assuming now that amplifier 91 continues to develop an error signal of a given phase and magnitude to thereby indicate that the balancing voltage is not sufficiently large enough to counterbalance the load signal generated by translater 31, servomotor 92 will therefore drive differently positionable arm 87 of adjustable means 89 towards its upper terminal of travel. Mounted substantially at the terminal positions of adjustable means 89 are normally inoperative switches 101 and 102, see FIG. 1. Switches 101 and 102 are operable by differentially positionable arm 87 being driven respectively to either its maximum or minimum voltage indicating positions by servo 92 in response to the error signal from error detector amplifier 91.

I have provided, upon the closing of switches 101 or 102, let us assume that it is 101, for automatic scale capacity changing circuitry to come into effect. The actual structure of my unique scale changing circuitry will be explained further hereinbelow, however, for the time being suffice it to say that what occurs is that range motor 113, see FIG. 2, will be operated to step bidirectional switch 38 to its next succeeding tap, and in this case to tap number 1. Also since the scale potentiometer voltage adjusting resistor 78 is conjointly controlled by switch 80 it, too, will be stepped to tap position 1. It is thus evident that the incremental voltage across scale or chart potentiometer 89 with switch 38 set at tap position zero must be able to be replaced by that voltage which is available at tap number 1 of resistor 67 when switch 38 is stepped thereto. Accordingly resistor 78 must be selected so that with a zero tap selection by switch 80 a voltage equal to the voltage available at tap number 1 of resistor 67 will be available across adjustable means 89. Further, upon selection of tap number 1, by the stepping of switch 38, the resistance afforded by resistor 78 must be varied to insure that the voltage across potentiometer 89 will be equal to the differences between the voltages available at taps 2 and 1 of resistor 67. This procedure is followed for all of the successive tap positions and accordingly the resistance currently switched into circuit by switch 80 must be such to insure that the voltage across adjustable means 89 is equal to the incremental voltage available at the next succeeding tap of resistor 67. Of course, the last increment of voltage necessary to accommodate the final step of load is supplied by the adjustable means 89 itself. Accordingly in keeping with my hereinbefore mentioned example, the voltage available at tap 1 of resistor 67 is 3 millivolts, an additional 4 millivolts is added by the movement of switch 36 to tap 2 for a total voltage of 7 millivolts etc. Also, needless to say, range step registering means, which I have shown in FIG. 1 in block diagram form, and which is numbered 99, and which may comprise any of the well-known devices, see for example Patent No. 2,944,808 of common ownership herewith, must be provided to indicate 10,000 pounds for each tap position steped off by switch 38. Furthermore, while I have shown unit 99 to be operated conjointly with switch 38 it should be understood that it could be operated from any of a number of different positions. However, when unit 99 is actuated it is operable to register zero pounds with switch 38 set at tap zero, 10,000 pounds for a setting of tap number 1, 20,000 pounds for tap setting two, etc. In addition dial 96 is operable to reflect the fractional weight counterbalanced by adjustable means 89. Therefore if a weight of say 95,000 pounds were placed upon the scale platform translator 31 would generate a voltage that would result in switch 38 being stepped to tap number 9, and indicator 99 would accordingly register 90,000 pounds of unit weight. Further adjustable means 89 would be positioned by servomotor 92 to supply a balancing voltage for the remaining 5,000 pounds and according chart 96 which is also driven by servomotor 92 will indicate the 5,000 pounds difference. The total weight will then be the sum of these two weight indications or 95,000 pounds.

Therefore, in my example, since resistor 67 has nine fixed taps it along with scale potentiometer 89 will allow the full capacity of transducer 31 to be divided over ten steps. Therefore, scale potentiometer 89 will only have to accommodate 10 per cent of the capacity of transducer 31 at any given time, and accordingly the zero to full chart indication of dial 96 can read this amount of load with greater accuracy.

Looking at my error detecting amplifier it should be mentioned that similar to the system described in the hereinabove mentioned patent, amplifier 91 is connected in circuit with the voltage generated by transducer 31 and the counterbalancing voltage generated by the quadrature circuit 32, the tare balancing circuit 33, the scale range circuit 34, and the span adjust circuit 35. Accordingly as the counterbalancing voltage is varied to equal that of transducer 31, and since it is 180 electrical degrees out-of-phase therewith, amplifier 91 will sense the resulting null to stop supplying an energizing voltage to the excitation coil of servomotor 92. Specifically it can be seen that amplifier 91 functions as an error detection amplifier and furnishes a voltage which has a magnitude that varies in accordance with the difference of the two signals applied thereto, and which has a phase which is the same as the phase of the larger magnitude signal.

As shown in FIG. 1, the amount of opposing voltage contributed to the counterbalancing circuit by potentiometer 89 is determined by the position of its movable arm 87. In turn the position of arm 87 is controlled and driven by servomotor 92 by way of connection 97. Connection 97 also conjointly controls the position of indicator 95 relative to the stationary load indicating chart 96. Therefore, so long as there is an unbalance between the voltage of transducer 31 and the counterbalancing voltage (in either a high or low direction) servomotor 92 will be operable to vary the voltage contributed by scale potentiometer 89. The amount of counterbalancing voltage contributed by potentiometer 89 is registered upon the dial 96.

Furthermore, as selectively positionable arm 87 approaches either terminal of potentiometer 89, indicating that more counterbalancing voltage is needed if terminal switch 101 is approached or less voltage is necessary if terminal switch 102 is approached, a range stepping means must be initiated to respectively step in or out the next immediate fixed tap of range resistor 67. This will be described in more detail later. At the same time the amount of range steps, unit weights, supplied to the counterbalancing circuit by the multitap resistor 67 is registered in a unit weight indicator 99. Accordingly, the total weight applied to the load cell is the sum of the indications at register 99 and dial 96. Of course, an automatic print out mechanism can also be used to totalize and print out the applied weight. The actual circuit to accomplish a range stepping will now be described.

The bidirectional motor driving means 133, see FIG. 2, which is employed to drive my bidirectional stepping switch 38 is of conventional shaded pole design. As shown in FIG. 2 a rotating magnetic field is established in the field windings 137 through 139 of motor 133 in accordance with well-known motor theory, to result in rotor 235 being moved in either a clockwise or counterclockwise direction. Specifically, upon servomotor 92 driving the adjustable arm of potentiometer 89 to its upper terminal switch 101 will be closed. The closing of switch 101 activates my load capacity changing circuitry which I have as yet to describe. The result of the closing of switch 101 will indicate to the capacity changing circuitry that the present capacity of load counterbalancing voltage which has been placed in circuit with the voltage generated by translator 31 is inadequate, and that the error detecting amplifier 91 still indicates that more counterbalancing voltage is necessary. In accordance with that determination, in a manner to be more fully explained later, the $K_3$ relay will be energized to result in the shorting out of winding 137 and a clockwise rotation being given to rotor 235. The effect of the clockwise rotation of motor 133 is to step bidirectional switch 38 in a tap increasing direction and thereby step both deck switches 36 and 80 to the next succeeding higher tap position. This stepping will continue until error detector 91 indicates that a sufficient increase in load balancing capacity has been added, whereupon relay $K_3$ will be deenergized and the motor energizing voltage will be removed from motor 133 to prevent further rotation thereof. Of course, if servo 91 had driven the adjustable arm of potentiometer 89 to its lower most position, and thereby indicating that there is an excess of scale capacity voltage for the amount of load currently being applied to translator 31, switch 102 would close. The closure of switch 102 would result in the actuation of the necessary circuitry to energize relay $K_4$ of FIG. 2. The energization of $K_4$ relay will result in the shorting out of field winding 139 and accordingly result in a counterclockwise rotation of rotor 235. The result of the counterclockwise rotation of motor 133 will be to step bidirectional switch 38 in a tap decreasing direction. Accordingly both switches 36 and 80 will be stepped to their succeedingly lower tap position. This stepping will continue until error detecting amplifier 91 indicates that a sufficient decrease in load balancing capacity has been achieved, whereupon relay $K_4$ will be deenergized and the motor energizing voltage will be removed from motor 133 to prevent further rotation thereof.

It should here be mentioned that suitable interlocking features which can take the form of mechanical stops or electronic circuitry can be employed to prevent servomotor 92 from continuing to rotate after the adjustable arm 87 has closed either of switches 101 or 102. The interlocking means would further be operable to prevent rotation of range motor 133 while servomotor 92 was rotating, and vice versa. Also interlocking means can be used to prevent motor 133 from operating past its highest or lowest range even though the switch (101 or 102) may be closed.

I will now described in considerable detail my scale capacity changing circuitry. As shown in FIG. 1 a secondary winding 27 is used to supply voltage of the same frequency and power line phase to the capacity changing circuitry as was supplied to the servomotor 92, the balancing voltage circuitry, and to translator 31. Accordingly the voltage feeding the capacity changing circuitry will be of the same frequency as that of the error signal developed by error detecting amplifier 91, and will have a zero or 180 electrical degree phase relationship with respect thereto. As shown in FIG. 1 the capacity changing circuitry is made up essentially of two parallel circuit paths, one being provided to occasion a clockwise rotation of the bidirectional range motor 133 and the other to occasion a counterclockwise rotation thereof. The switch contacts marked 101 correspond to the upper limit indication switch 101 which is operatively positioned substantially at the upper terminal of adjustable means 89. Similarly switch contacts 102 correspond to the lower terminal indicating switch 102 mounted substantially at the lower terminal of adjustable means 89. Diodes 103 and 106 will then have their respective cathodes, 104 and 107, connected to one side of the contacts 101 and 102. The other side of contacts 101 and 102 being connected together and returned to one terminal of secondary winding 27 by way of a series resistor 150 and diode 152 connection, see FIG. 1. The anode 105 of diode 103 is connected to one terminal of condenser of 111. The other terminal of condenser 111 is connected to the heretofore unconnected terminal of secondary winding 27 by way of resistor 124. This latter terminal of secondary winding 27 is grounded. A relay coil $K_3$ is connected across the terminals of capacitor 111 in a manner shown in FIG. 1. Further, a transistor type switch 127 having a collector 130, and emitter 134 and base 132 is connected across diode 103 and relay $K_3$. Specifically the current carrying collector terminal 130 is connected to the junction point of cathode 104 of diode 103 and the lower contact of switch 101. The other main current carrying terminal of transistor 127, emitter 134, is connected to the junction point of relay $K_3$ and resistor 124. A similar transistor 135, diode 106, relay $K_4$, condenser 112, and resistor 125 circuit arrangement as described connects the lower contact of switch 102 to the ground terminal of secondary winding 27, as shown in FIG. 1. There is also provided as shown in FIG. 1, a signal transformer 140 having primary winding 141 and grounded center tap secondary winding 142. The primary winding 141 is connected to the output of error detecting amplifier 91 and accordingly will have applied thereto the error signal developed by amplifier 91. One terminal of secondary winding 142 is connected to the control terminal, base 132, of transistor switch 127, and the other terminal of winding 142 is connected to the control terminal, base 133, of switching transistor 126.

Diode 152 will conduct for the negative portion of the alternating signal which is applied by way of secondary winding 27 to the cathode of diode 152, and be nonconducting for the positive portion of the applied voltage. Accordingly, only the negative portion of the alternating current signal will be available at the terminals of contacts 101 and 102. Subsequently upon the closure of either set of contacts, which closure as previously explained is dependent upon the direction that the error signal directs the servomotor to drive the adjustable arm 87 of potentiometer 89, the half-wave rectified signal will be applied therethrough to the cathode of either diode 103 or 106. Therefore since the signal which is applied is in the negative direction the corresponding diode to whose cathode it is applied will be switched to apply the negative half-wave signals to either relay coils $K_3$ or $K_4$. Within a very short time condenser 111 or 112 will be fully charged to maintain an effective steady voltage across the energized relay coil. It should here be mentioned that the energization of relay coil $K_3$ or $K_4$ will result in a clockwise or counterclockwise rotation of motor 133 in the manner expained hereinbefore in connection with FIG. 2. Diodes 103 and 106 are effective to prevent the discharge of condensers 111 and 112 respectively through the transistors 127 or 126 upon the cathode of diode 103 or 106 rising to ground potential during the interval between the negative pulses of the half-wave rectified alternating signal. The discharge of condensers 111 or 112 will occur because base of transistor is negative for the positive half cycle of the supply voltage, thus turning the transistors on. Accordingly, by a use of rectifying diode 152 and the filtering action of the capacitors a suitable relay actuating voltage will be applied across relay coils $K_3$ or $K_4$ to cause the desired direction of rotation of motor 133.

Further, as was explained above, error detecting amplifier 91 will generate a signal of a given phase and magnitude in accordance with the phase and magnitude of the transistor 31 signal and of the balancing voltage signal. In accordance with this signal servomotor 92 will be operable to position adjustable arm 87 of adjustable means 89 until an error signal of zero volt magnitude is sensed. Connection 97 which operatively connects the shaft of servomotor 92 to adjustable arm 87, also connects motor 92 to pointer 95 and thereby assures that pointer 95 will reflect the correct pound loading. However, if the error signal has not decreased to zero by the time that arm 87 approaches either terminal of potentiometer 87 servomotor will continue to run to result in a closing of switch 101 or 102. At this point an interlock, not shown, is activated which prevents the further rotation of servo 92 and permits the rotation of shaded pole motor 133. Upon the closing of switch 101 or 102 the switch contacts so labeled across secondary winding 27 will close to apply the negative half-wave signals developed by diode 152 to energize either of relays $K_3$ or $K_4$. Upon the energization of relay $K_3$ or $K_4$ its associated normally open contacts shown in FIG. 2 will close, and its associated normally closed contacts will open. Accordingly, either winding 137 or 139 of motor 133 will be shorted to result respectively in a clockwise or counterclockwise rotation thereof. In this manner switch 38, which is operatively connected to motor 133, will be stepped in a tap increasing or decreasing direction. As the tap setting of switch 38 is varied the balancing voltage which opposes that of translator 31 will be varied, and since error detector 91 is connected in circuit therewith it will respond to this varying voltage. As increments of scale capacity changing voltages are added to the voltage currently being developed by adjustable means 89 the error signal will continuously decrease until it will reach zero, which will only occur if the translator voltage is exactly equal to one of the tap voltages, or as will be the case the majority of times the balancing voltage will change until a reversal in phase of the error signal is achieved. Specifically, if originally the balancing voltage was less than the load signal, to thereby cause an error signal having a phase which drives servomotor 92 in a direction to close switch 101, and energize relay $K_3$ a clockwise rotation of motor 133 will occur. As a result of the clockwise rotation of motor 133 switch 38 will be rotated in a tap increasing direction to increase the balancing voltage. As more and more scale capacity increasing voltage is switched into operation the correct load accommodating capacity will be attained. Upon the proper load accommodating capacity being attained the error signal of detector 91 will change in phase by 180 electrical degrees. As mentioned above transistor 127 is operatively connected across relay $K_3$, see FIG. 1, and has its control electrode, base 132, connected to one terminal of the secondary winding 142 of transformer 140. The primary winding 141 of transformer 140 is connected to the output terminal of error detector 91, further, the potential applied to the collector 130 of transistor switch 127 will be the negative half-wave rectified pulses from secondary transformer winding 27. Accordingly, the polarity of the windings of transformer 140 is chosen so that the phase of the error signal applied to base 132 will be out-of-phase with the negative pulsating collector voltage. Therefore, transistor 127 will be normally non-conducting to permit an energizing current to flow through relay $K_3$. However upon the system achieving its proper load accommodating capacity, as explained above, the phase of the error signal will be reversed by 180 electrical degrees. The change in phase of the error signal which is applied to base 132 of transistor 127 will then be in phase with the collector potential thereof to result in the turning on of transistor 127. The conduction of transistor 127 is effective to short out relay $K_3$ and accordingly the rotating field of motor 133 will be removed to prevent further rotation thereof. The result of the above operations is that tap changing switch 38 will be stopped at the correct scale capacity for the current load. Upon the stopping of rotation of motor 133 the interlock circuitry spoken of above will be effective to enable further positioning of servomotor 91. However, now since there has been a reversal in phase of the error signal servo 91 will be responsive to the error signal to back off arm 87 in a balancing direction away from the upper terminal of potentiometer 89. Upon the backing off of arm 87 from the upper terminal of potentiometer 89 switch 101 will open and result in the opening of the circuit path of transistor 127 to prevent further conduction thereof. Upon a repositioning of arm 87 the error signal will be reduced to zero and further movement of the servomotor will cease. The amount of load applied to translator 31, in pounds will then be read from the range step registering means 99 and chart 96.

Without retracting the steps in the case of a system capacity which is greater than that needed to accommodate the currently applied load it is clear that switch 102, relay $K_4$, transformer 140 and transistor 126 operate in similar fashion to accomplish an effective scale capacity changing circuitry for such a case.

While it will be apparent that the embodiment of the invention herein disclosed is well calculated to fulfill the objects of the invention, it will be appreciated that the invention is susceptible to modification, variation and change without departing from the proper scope or fair meaning of the appended claims.

Having described the invention, I claim:

1. In a load weighing system having a load receiving transducing element generating a voltage responsive and proportional to the application of a load thereto, a counterbalancing voltage circuit generating a voltage in phase opposition to that of said transducing element and including a potentiometer having a positionable arm driven by a servomotor providing a voltage to said counterbalancing circuit in accordance with the setting of the arm, and a multitapped system capacity changing resistor having a tap selecting slider driven by a second motor providing any of a plurality of magnitudes of voltages to said counterbalancing circuit in accordance with the tap setting of the slider, an error detecting amplifier operatively connected in circuit with said transducing element and said counterbalancing circuit and operable to drive said servomotor in either of two directions in response to the phase of the detected error signal, and a phase sensitive control circuit for said second motor comprising, potentiometer terminal indicating means operable in response to said potentiometer arm approaching the terminal positions of said potentiometer, activating means for said second motor responsive to said terminal indicating means indicating that said potentiometer arm is approaching a terminal thereof to change the tap setting of said multitapped resistor and thereby provide the appropriate counterbalancing voltage to oppose said voltage from said transducing element, said error detecting amplifier generating an error signal of a given phase in response to said counterbalancing voltage circuit providing a signal of improper balancing range relative to said transducing element voltage and generating an error signal of an opposite phase upon said voltage provided by said counterbalancing circuit being within a proper balanceable range, phase sensitive means preventing further changes in the tap setting of said multitapped resistor upon sensing a change in phase of said error signal, and load indicating means indicating the magnitude of the applied load.

2. A load weighing system comprising load receiving transducer means generating a voltage which is a function of the load applied thereto, adjustable means in circuit with the transducer means supplying a balancing voltage in opposition to the voltage generated by said transducer means, an error detecting amplifier operatively connected in circuit with both of said means and resulting in an error signal having an amplitude equal to the difference between the voltages, servo means for adjusting said adjustable means in a balancing direction in response to said error signal, a capacity changing multitapped resistor in circuit with said adjustable means providing increments of voltage to said balancing voltage to change the capacity of the system in accordance with the capacity necessary to accommodate the applied load, a multitapped balancing voltage varying resistor in circuit with said adjustable means and providing a variable full capacity voltage to said balancing voltage in accordance with the tap setting of said capacity changing resistor, bidirectional stepping means operatively connected for concurrent selection of corresponding taps of said multitapped resistors, bidirectional driving means operable to step said stepping means, system capacity changing switches operatively positioned substantially at the terminal positions of said adjustable means and operable to activate said bidirectional driving means in a load balancing direction in response to said servo means tending to drive the adjustable means to said terminal positions, and means to deactivate said bidirectional driving means upon the system capacity attaining a load accommodating capacity.

3. A weighing scale comprising, a load receiving transducing means generating a voltage which is a function of a load applied thereto, adjustable means in circuit with the transducing means supplying a balancing voltage in opposition to the voltage generated by said transducing means, an error detecting amplifier operatively connected in circuit with both of said means and resulting in an error signal having an amplitude equal to the difference of the voltages, servo means for adjusting said adjustable means in a balancing direction in response to said error signal, bidirectional stepping means operatively connected in circuit with said adjustable means providing increments of voltage to said balancing voltage to change the capacity of the scale in accordance with the capacity necessary to accommodate the applied load, bidirectional driving means operable to step said stepping means, system capacity changing switches operatively positioned substantially at the limits of said adjustable means and operable in response to said servo means tending to drive said adjustable means to said limits, said switches controlling said bidirectional driving means to drive in a load balancing direction, and means to deactivate said bidirectional driving means upon the system capacity attaining a load accommodating capacity.

4. In a weighing scale the combination with a load responsive transducing means generating a voltage which is a function of a load applied thereto, adjustable means in circuit with the transducing means supplying a balancing voltage in opposition to the voltage generated by said transducing means, an error detecting amplifier operatively connected in circuit with both said means and generating an error signal having an amplitude equal to the difference therebetween, servo means altering the voltage from said adjustable means in a balancing direction in response to said error signal, bidirectional stepping means operatively connected in circuit with said adjustable means providing increments of voltage to said balancing voltage to change the capacity of the scale in accordance with the capacity necessary to accommodate the applied load, said error detecting amplifier operative to generate an error signal of one phase immediately prior to the actuation of said bidirectional stepping means and of an opposite phase upon said stepping means providing a proper increment of balancing voltage, of a scale capacity changing circuit comprising, driving means operatively coupled to said bidirectional stepping means, said driving means having directional control circuits governing the direction of movement thereof, said control circuits including, first and second normally inoperative switches, one of said switches mounted substantially at one terminal of said adjustable means and the other substantially at the other terminal of said adjustable means, said switches accordingly being operable upon said servo means tending to drive said adjustable means to said terminals, first and second normally inoperative driving circuit control elements operatively connected in series circuit respectively with said first and second switches, said two series circuit arrangements operatively connected across an alternating potential source, first and second phase sensitive switching elements respectively connected across said first and second driving circuit control elements, and being in a normally inoperative state and operable in response to the change in phase of the error signal generated by said error detecting amplifier, whereby upon the indication of a necessary change of capacity of said scale, by the operation of one of the said terminal switches, one of said series circuit paths will be completed to permit movement of said driving means in a balancing direction, said movement continuing until the correct incremental voltage change has been provided by said stepping means, whereupon said phase sensitive switching elements will be operated to reopen said driving circuit control elements and prevent further movement of said driving means.

5. In a weighting scale the combination with a load responsive transducing means generating a voltage which is a function of a load applied thereto, adjustable means in circuit with the transducing means supplying a balancing voltage in opposition to the voltage generated by said tranducing means, an error detecting amplifier operatively connected in circuit with both said means and generating an error signal having an amplitude equal to the difference between the voltages, servo means altering the voltage from said adjustable means in a balancing direction in response to said error signal, bidirectional stepping means operatively connected in circuit with said adjustable means providing increments of voltage to said balancing voltage to change the capacity of the scale in accordance with the capacity necessary to accommodate the applied load, said error detecting amplifier operative to generate an error signal of one phase immediately prior to the actuation of said bidirectional stepping means and of an opposite phase upon said stepping means providing a proper increment of balancing voltage, of a scale capacity changing circuit comprising, driving means operatively coupled to said bidirectional stepping means, said driving means having directional control circuits governing the direction of movement thereof, first and second normally open switches mounted one at one terminal of the adjustable means and the other at the other terminal of the adjustable means, said switches operable in response to said servo means tending to drive said adjustable means to said terminals, first and second relay control means respectively connected in series circuit with said first and second normally open switches, the energization of one of said relay control means completing the directional control circuit of said driving means to permit movement thereof in a first direction, the energization of the other relay control means completing the directional control circuit of said driving means to permit movement in an opposite direction, said series circuits each connected across a source of alternating voltage, said alternating voltage being of similar frequency as said error signal and having a predetermined phase relationship thereto, relay voltage filtering means operatively connecting in circuit with said relays to provide a proper energizing voltage thereto upon the closing of one of said normally open switches, first and second transistor switches, each having two main current carrying terminals and a control element, the two main current carrying terminals of said transistor switches being connected across respective ones of said first and second relay control means, and an error signal coupling transformer having a primary winding to which is applied said error signal and a tapped secondary winding, the ends of said secondary winding connected to said control elements of said first and second transistor switches, said transistor switches therefore normally being opened until the signal from said alternating voltage source as applied to the current carrying terminals of one of the transistor switches; is in phase with the error signal being applied to said one of the transistor switches, whereupon the respective transistor switch will conduct to shunt the relay energization current from its associated relay control means and thereby open said directional control circuits and prevent further movement of the driving means, accordingly upon the closing of one of said normally open switches after the application of a load to said scale, thus indicating an improper scale capacity, said relay control means will be energized to drive said driving means and bidirectional stepping means in a voltage balancing direction, said driving continuing until the correct scale capacity is achieved whereupon the resulting change in phase of said error signal will energize the respective transistor switch to prevent further movement of said driving means.

6. For use with a load responsive device having, a transducer generating a voltage in response and in proportion to the load applied thereto, a potentiometer having a selectively positionable arm connected in circuit with said transducer and generating a voltage in accordance with the position of said arm, said voltage being in phase opposition to that of said transducer, an error detecting amplifier operatively connected in circuit with said transducer and said potentiometer, said amplifier responsive to signals generated thereby to produce a signal having a magnitude equal to the difference between the voltages, servo means responsive to the phase and magnitude of said error signal to drive said selectively positionable arm of said potentiometer in an error signal eliminating direction, auxiliary, load capacity increasing, incremental voltage sources producing incremental voltages of the same phase as that generated by said potentiometer, and capacity varying activating means for driving said auxiliary load capacity increasing voltage sources, comprising, means responsive to said selectively positionable arm approaching a terminal position of potentiometer without resulting in an error signal elimination, bidirectional stepping means operable for movement in opposite directions in accordance with the terminal position of said potentiometer approached by said potentiometer arm, said stepping means operatively connecting selected ones of said increments of voltages in circuit with said potentiometer for elimination of said error signal, and phase sensitive switching means operatively connecting said error detecting amplifier to said bidirectional stepping means and responsive upon a detection of a change in phase of said error signal to prevent further capacity changes in said load responsive device.

References Cited by the Examiner
UNITED STATES PATENTS

| | | | |
|---|---|---|---|
| 2,733,911 | 2/1956 | Thurston | 177—211 |
| 2,936,165 | 5/1960 | Thorsson | 177—211 |
| 2,938,701 | 5/1960 | Thorsson et al. | 177—70 |
| 2,944,808 | 7/1960 | Spademan | 177—211 |
| 3,066,752 | 12/1962 | Spademan | 177—211 |

LEO SMILOW, *Primary Examiner.*